United States Patent
Kammath et al.

(10) Patent No.: US 10,452,234 B2
(45) Date of Patent: Oct. 22, 2019

(54) METHOD AND DASHBOARD SERVER PROVIDING INTERACTIVE DASHBOARD

(71) Applicant: Huawei Technologies Co., Ltd., Shenzhen (CN)

(72) Inventors: V Vimal Das Kammath, Bangalore (IN); Puneet Gupta, Bangalore (IN); Naganarasimha Ramesh Garla, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 15/586,865

(22) Filed: May 4, 2017

(65) Prior Publication Data

US 2017/0235448 A1 Aug. 17, 2017

Related U.S. Application Data

(63) Continuation of application No. PCT/CN2015/079938, filed on May 27, 2015.

(30) Foreign Application Priority Data

Nov. 5, 2014 (IN) .......................... 5568/CHE/2014

(51) Int. Cl.
 *G06F 9/48* (2006.01)
 *G06F 3/0482* (2013.01)
 *G06F 16/26* (2019.01)
 *G06F 16/11* (2019.01)
 *G06F 16/904* (2019.01)

(52) U.S. Cl.
 CPC .......... *G06F 3/0482* (2013.01); *G06F 16/128* (2019.01); *G06F 16/26* (2019.01); *G06F 16/904* (2019.01)

(58) Field of Classification Search
 CPC ............. G06F 3/0482; G06F 17/30088; G06F 17/30572; G06F 17/30994; G06F 16/26; G06F 16/904; G06F 16/128
 See application file for complete search history.

(56) References Cited

U.S. PATENT DOCUMENTS

2002/0065863 A1\* 5/2002 Fruensgaard ..... G06F 17/30448
 718/100
2008/0147671 A1 6/2008 Simon et al.
 (Continued)

FOREIGN PATENT DOCUMENTS

| CN | 102567539 A | 7/2012 |
| CN | 103744852 A | 4/2014 |
| CN | 103761219 A | 4/2014 |

OTHER PUBLICATIONS

Android Does: "Fancy Widgets—version 3 .5 .6," Apr. 3, 2014, XP055410144, 3 pages.
 (Continued)

*Primary Examiner* — Jennifer N To
*Assistant Examiner* — Kc Chen
(74) *Attorney, Agent, or Firm* — Slater Matsil, LLP

(57) ABSTRACT

A method of providing an interactive dashboard of a process for offline analysis by a dashboard server is disclosed. The dashboard server receives selection of a dashboard of the process. The user may export the selected dashboard for offline analysis. The selected dashboard may be exported in at least one of dynamic interactive format and static interactive format. The dashboard server generates dynamic interactive packet for the dynamic interactive format. The dynamic interactive packet includes information for rendering a dynamic interactive dashboard of the selected dashboard. The dashboard server generates static interactive packet for the static interactive format. The static interactive packet includes one or more snapshots corresponding to each of one or more interactions on the selected dashboard. The dashboard server provides an interactive dashboard to the user for the offline analysis using either the static interactive format or the dynamic interactive packet.

12 Claims, 15 Drawing Sheets

(56) References Cited

U.S. PATENT DOCUMENTS

| | | |
|---|---|---|
| 2009/0217194 A1 | 8/2009 | Martin et al. |
| 2010/0058181 A1 | 3/2010 | Ganesan et al. |
| 2012/0041990 A1 | 2/2012 | Kreindlina et al. |
| 2012/0310875 A1 | 12/2012 | Prahlad et al. |
| 2013/0042190 A1* | 2/2013 | Ciloci .................... G06Q 10/10 715/764 |
| 2013/0174019 A1 | 7/2013 | Braud et al. |
| 2013/0318083 A1 | 11/2013 | Han et al. |
| 2014/0136298 A1 | 5/2014 | Marchand et al. |

OTHER PUBLICATIONS

Anonymous: "Fancy widgets FAQ Android Does," Feb. 27, 2014, XP055410138, 3 pages.
Treacy, Mynda, et al., "Interactive Excel Web App Dashboard-My Online Training Hub", www.myonlinetraininghub.com/interactive-excel-web-app-dashboard, May 14, 2014, 83 pages, XP055615872.
Sharepoint Server, "Excel Services Architecture/Microsoft Does", https://docs.microsoft.com/en-us/previous-versions/office/developer/sharepoint-2010/ms546696(v%3Doffice.14), Jul. 24, 2014, total 5 pages. XP055616475.
Sharepoint Server, "Excel Services Overview/Microsoft Docs", https://docs.microsoft.com/en-us/previous-versions/office/developer/sharepoint-2010/ms582023(v%3Doffice.14), Jul. 24, 2014, 7 pages, XP055615880.
IBM "Business intelligence for business users: Insight when and where you need it", Business Analytics Software, IBM Software Group, White Paper, Oct. 1, 2010, 10 pages, XP055616606.

\* cited by examiner

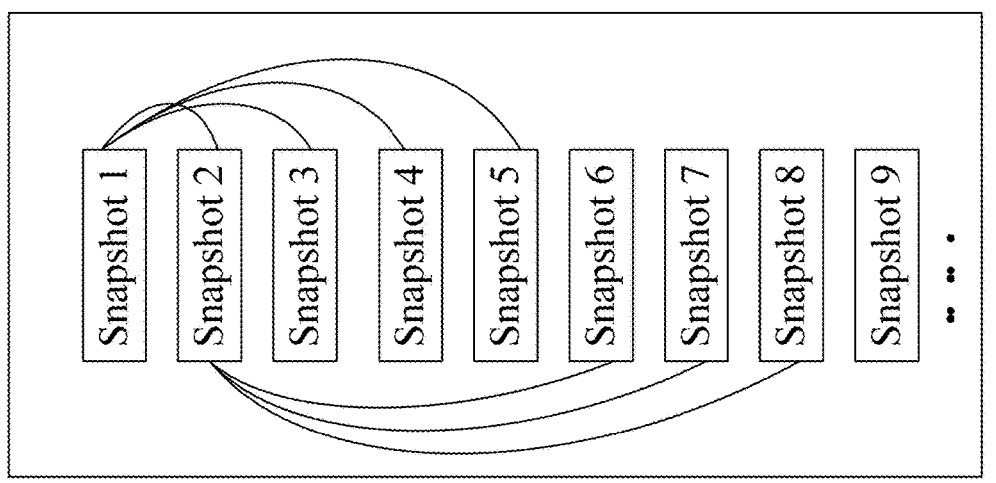

METHOD AND DASHBOARD SERVER PROVIDING INTERACTIVE DASHBOARD

CROSS-REFERENCE TO RELATED APPLICATIONS

This application is a continuation of International Application No. PCT/CN105/079938, filed on May 27, 2015, which claims priority to Indian Patent Application No. IN5568/CHE/2014, filed on Nov. 5, 2014. The disclosures of the aforementioned applications are hereby incorporated by reference in their entireties.

TECHNICAL FIELD

The present disclosure relates to management information system. In particular, the present disclosure is related to a method and dashboard server for providing an interactive dashboard.

BACKGROUND

Generally, a dashboard is a graphical interface for displaying the current status of organization's key performance indicators. The dashboard comprises of multiple interrelated components/metrics wherein selection of a data in one metric activates refresh of data in one or more metrics. The dashboard can be exported in one or more formats, for example image format or pdf format. Exporting the dashboard allows the user to view the results over different networks. Exporting the dashboard is necessary when the user wishes to save some events of the real-time dashboards as the real-time dashboards refresh frequently. Exporting the dashboard may also be required when the user wishes to share the dashboard with one or more users in a different network. Exporting dashboards is also necessary for future reference i.e. the data on which the dashboard is created will be large and this data will be periodically removed from the storage after a predefined time period. Hence, the desired dashboards can be backed up with all the interactions and can be used later for analysis of the process.

One of the conventional methods illustrates method of exporting the dashboard by taking a snapshot of the screen/window. This helps in saving all the sections visible on the screen as shown in FIG. 1. But the problem in this method is that the entire dashboard is exported as a single image. Therefore, only those components/metrics which are visible in the dashboard are exported as an image. But, there may be few other components/metrics in the dashboard which are visible upon scrolling the scroll pane as indicated in (A), (B) and (C). These components/metrics are not visible on the dashboard and hence they are not exported. Further, the exported dashboard does not provide interactions between the components/metrics i.e they do not provide the feel of the live dashboards. If all the interactions are to be captured, then a lot of individual images of different components have to be taken in different images and the user has to relate the multiple images manually. This process is time consuming and also increases the load on the dashboard server.

SUMMARY

The objective of the present disclosure is to provide an interactive dashboard wherein the interactive dashboard can be used for offline analysis in an interactive way.

The present disclosure relates to a method of providing an interactive dashboard for offline analysis. The method comprises receiving a selection of a dashboard by a dashboard server, wherein the dashboard displays information of one or more key performance indicators of the process. Upon receiving the selection of the dashboard, the dashboard server generates at least one of a dynamic interactive packet or a static interactive packet for the selected dashboard using dashboard data stored in a memory of the dashboard server. The dynamic interactive packet comprises information for rendering a dynamic interactive dashboard of the selected dashboard and the static interactive packet comprises one or more snapshots corresponding to each of one or more interactions on the selected dashboard. The method further comprises providing an interactive dashboard to the user for the offline analysis using at least one of the dynamic interactive packet or the static interactive packet.

The present disclosure discloses a dashboard server for providing an interactive dashboard for offline analysis. The dashboard server comprises a receiving module, a dynamic interactive module and a static interactive module. The receiving module receives selection of a dashboard from one or more dashboards of the process. The dashboard server generates at least one of a dynamic interactive packet or a static interactive packet for the selected dashboard using dashboard data stored in a memory of the dashboard server. The dynamic interactive packet comprises information for rendering a dynamic interactive dashboard of the selected dashboard and the static interactive packet comprises one or more snapshots corresponding to each of one or more interactions on the selected dashboard. The dashboard server provides an interactive dashboard to the user for the offline analysis using at least one of the dynamic interactive packet or the static interactive packet.

In an embodiment, the present disclosure provides a method for generating the dynamic interactive dashboard. The method comprises identifying one or more metrics in the selected dashboard. Upon identifying the one or more metrics, the one or more dependencies between the one or more metrics are identified. The information associated with one or more dependencies between the one or more metrics is stored in the dashboard data. The method further comprises expanding query associated with each of the one or more metrics based on the one or more dependencies between the one or more metrics, executing the expanded query for each of the one or more metrics, storing the data record of results of the executed query and generating the dynamic interactive packet using the data record and the dashboard data. The dynamic interactive packet includes information for rendering the dynamic interactive dashboard.

In an embodiment, the present disclosure provides a method for generating the static interactive format. The method comprises identifying one or more metrics in the selected dashboard. Upon identifying the one or more metrics, the one or more interactions between each of the one or more metrics are determined. The method further comprises generating a snapshot for each of the one or more interactions and linking the snapshots based on the one or more interactions between each of the one or more metrics. Finally, the method comprises generating the static interactive packet, wherein the static interactive packet comprises the snapshots corresponding to each of the one or more interactions on the selected dashboard.

The present disclosure relates to a non-transitory computer readable medium including operations stored thereon that when processed by at least one processor cause a dashboard server to perform the steps of receiving a selection of a dashboard, wherein the dashboard display information of one or more key performance indicators of a process. Then the step of generating at least one of a dynamic interactive packet and a static interactive packet for the selected dashboard using dashboard data stored in a memory of the dashboard server is performed, wherein the dynamic interactive packet comprises information for rendering a dynamic interactive dashboard of the selected dashboard and the static interactive packet comprises one or more snapshots corresponding to each of one or more interactions on the selected dashboard. Next, the step of providing an interactive dashboard to the user for offline analysis is performed using at least one of the dynamic interactive packet and the static interactive packet.

The present disclosure provides an interactive dashboard for offline analysis in either dynamic interactive format or a static interactive format. The dynamic interactive format is provided using a dynamic interactive packet and the static interactive format is provided using the static interactive packet. The dashboard server generates the dynamic interactive packet and the static interactive packet. In the static interactive format the one or more snapshots with links are provided. When the user selects a data item in the snapshot, the link would open/scroll the other snapshot. So the user can perform the offline analysis in an interactive way using the static interactive packet thereby reducing the load on the server. The dynamic interactive format contains information for rendering the dashboard that looks and works exactly like the original dashboard but without the use of server thereby reducing the load on the server. The interactive dashboard may be provided to one or more users in different network using at least one of the static interactive format and the dynamic interactive format since there is no requirement of the server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the present disclosure are set forth in the appended claims. The embodiments of the present disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

FIGS. 7a-7d illustrates an exemplary embodiment of providing a static interactive format for exporting the selected dashboard in accordance with some embodiments of the present disclosure;

Figure 1:
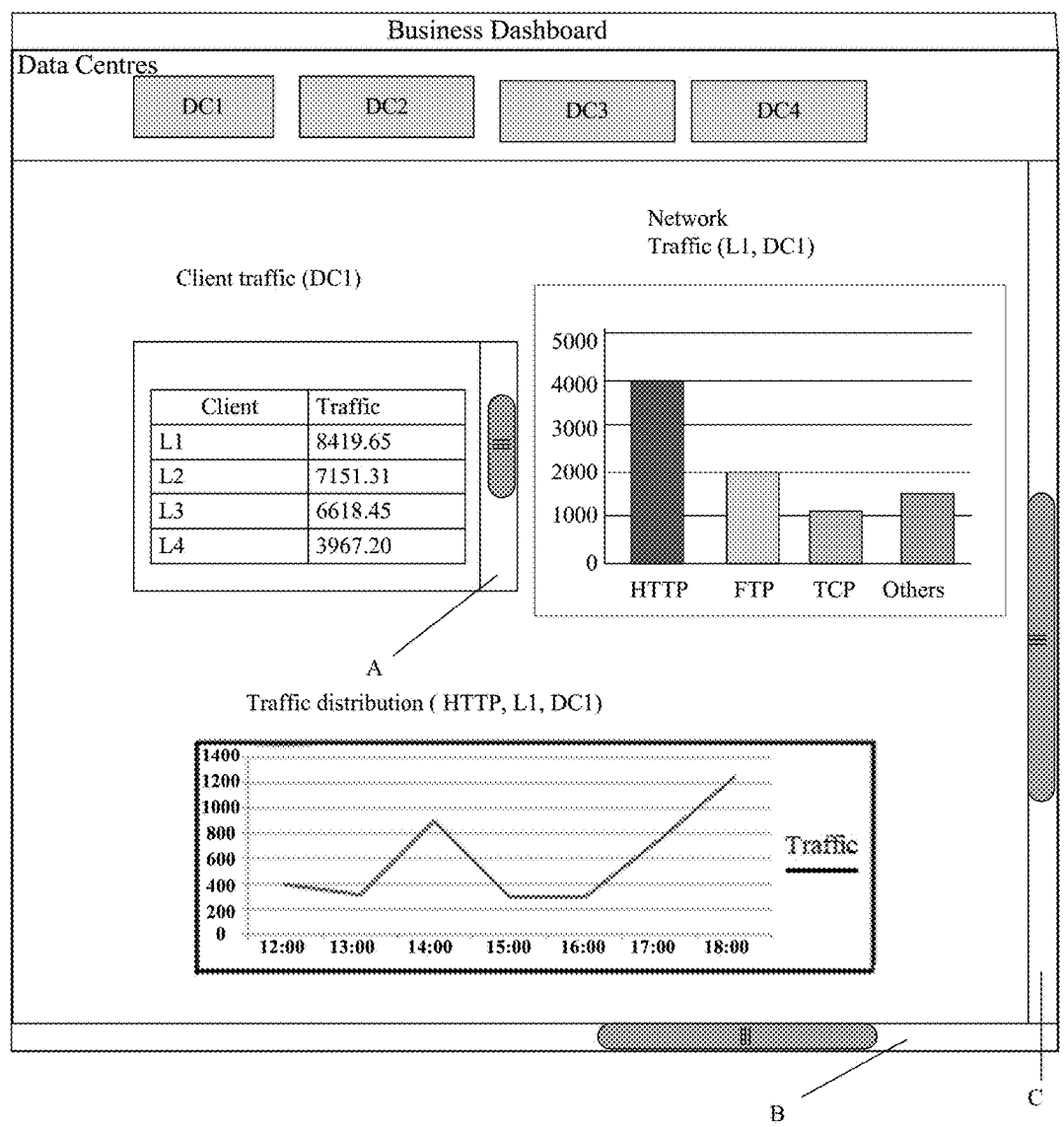
FIG. 1 shows an exemplary exported dashboard in accordance with the prior art.

The figures depict embodiments of the present disclosure for purposes of illustration only. One skilled in the art will readily recognize from the following description that alternative embodiments of the structures and methods illustrated herein may be employed without departing from the principles of the present disclosure described herein.

DETAILED DESCRIPTION OF ILLUSTRATIVE EMBODIMENTS

The foregoing has broadly outlined the features and technical advantages of the present disclosure in order that the detailed description of the invention that follows may be better understood. Additional features and advantages of the invention will be described hereinafter which form the subject of the claims of the invention. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

As used herein, the term "management information system" refers to a system for providing information required by the organizations for managing the organization effectively, the term "dashboard" refers to a real-time user interface for providing graphical representation of key performance indicators of a process, the term "process" refers to collection of related, structured activities or tasks that produce a specific service or product, the term "metrics" refers to visual representation of the data in the dashboard, wherein the metrics may be in the form of, for example a chart, a graph, text or a table.

Embodiments of the present disclosure relates to a method of providing an interactive dashboard of a process for offline analysis by a dashboard server. The dashboard server receives selection of a dashboard from a user. The user may select the dashboard from the one or more dashboards stored in a memory. The user may also select the dashboard from the real-time dashboard of the process. The dashboard server is configured with a dynamic interactive module and a static interactive module. The dashboard server may generate at least one of the dynamic interactive packet and the static interactive packet. The method of generating the dynamic interactive packet includes, identifying one or more metrics in the dashboard, executing a query corresponding to each of the one or more metrics in the selected dashboard. The method further includes storing a data record of results of the executed query and generating an interactive data, wherein the interactive data includes the information for rendering the dynamic interactive dashboard using the data record and the dashboard data. The method of generating the static interactive packet includes identifying one or more metrics in the selected dashboard, determining one or more interactions between each of the one or more metrics. The method further includes generating a snapshot for each of the one or more interactions and linking the snapshots based on the one or more interactions between each of the one or more metrics. The user may provide the dynamic interactive packet or the static interactive format for the offline analysis.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Figure 2:
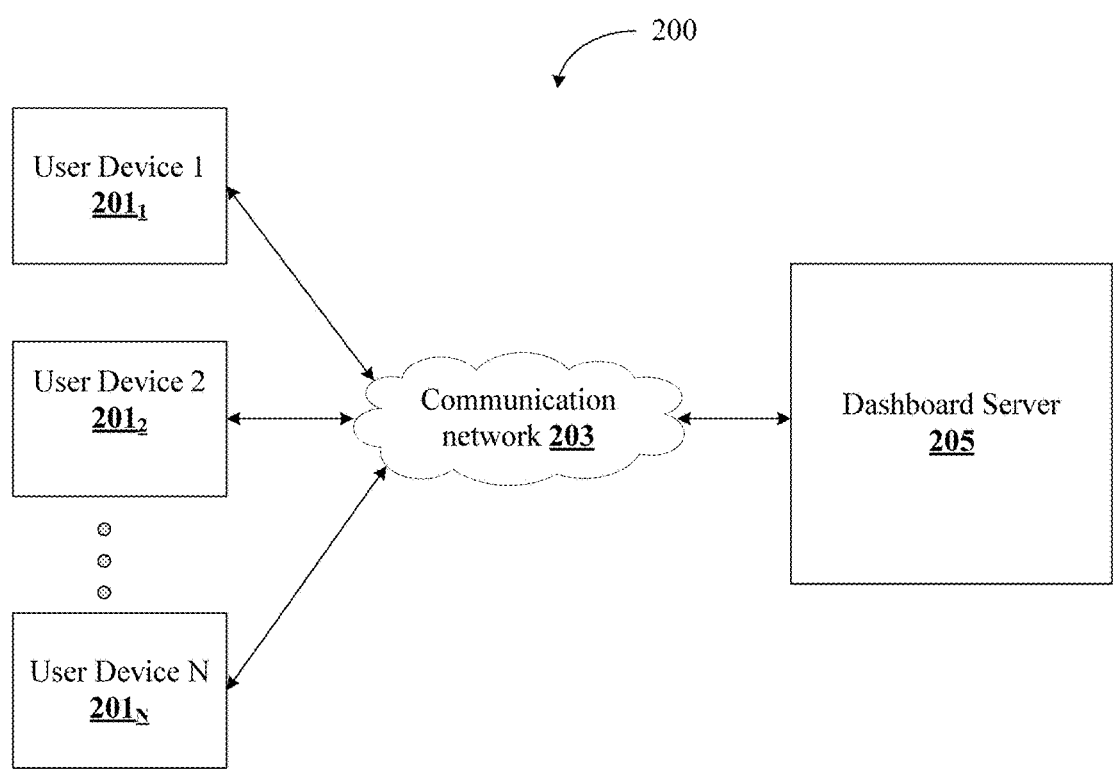
FIG. 2 illustrates an exemplary environment for providing an interactive dashboard of a process for offline analysis in accordance with some embodiments of the present disclosure.

FIG. 2 illustrates an exemplary environment 200 for providing an interactive dashboard of a process for offline analysis in accordance with some embodiments of the present disclosure.

As shown in FIG. 2, the environment 200 includes one or more user devices, user device 1 201I to user device n 201n (collectively referred as user device 201), a communication network 203 and a dashboard server 205. The one or more user devices 201 may be communicatively connected to the dashboard server 105 through the communication network 203. The communication network 103 may be a wireless network, wired network or a combination thereof. In one implementation, the dashboard server 205 may be implemented in a variety of computing systems, such as a laptop computer, a desktop computer, a notebook, a workstation, a mainframe computer, a server, a network server, and the like. In an embodiment, the dashboard server 205 is implemented in an organization to provide graphical representation of key performance indicators of the organization. The key performance indicators evaluate particular activity of the organization. The one or more user devices 201 may be used by various stakeholders or end users of the organization to view the dashboard of the process.

In an embodiment, the user may export the interactive dashboard for the offline analysis. The user may export the dashboard for the offline analysis to one or more users within the organization or outside the organization. In this scenario, the user selects a dashboard for exporting. The selected dashboard may be exported in either a dynamic interactive format or a static interactive format. In the dynamic interactive format, the dynamic interactive packet is generated. The dynamic interactive packet includes information for rendering a dynamic interactive dashboard of the selected dashboard. In the static interactive format a static interactive packet is generated. The static interactive packet comprises one or more snapshots corresponding to each of one or more interactions on the selected dashboard.

Figure 3A:
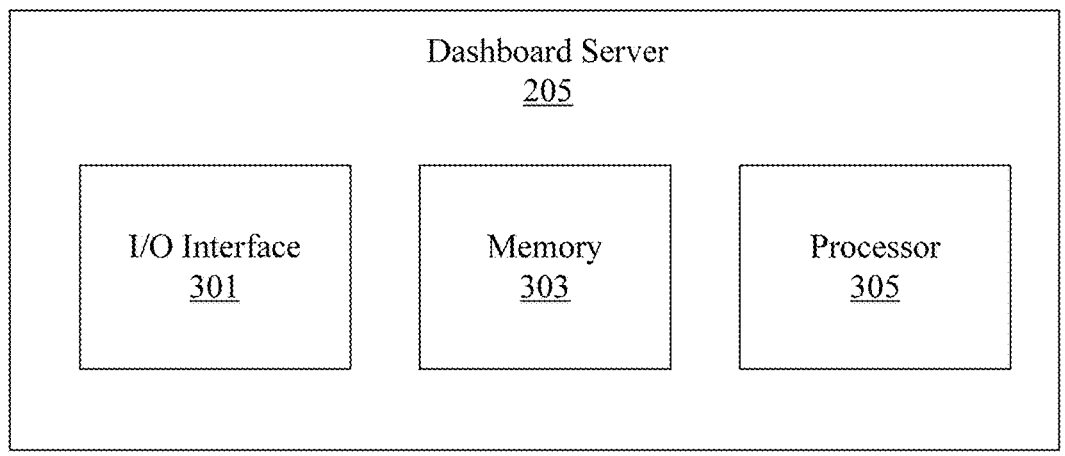
FIG. 3a shows an exemplary block diagram illustrating a dashboard server with processor and memory for providing an interactive dashboard for offline analysis in accordance with some embodiments of the present disclosure.

FIG. 3a shows an exemplary block diagram illustrating a dashboard server with processor and memory for providing an interactive dashboard for offline analysis in accordance with some embodiments of the present disclosure.

The dashboard server 205 comprises an interface 301, a memory 303 and a processor 305. The interface 301 is coupled with the processor 305 through which data are received from the one or more user devices 201. The memory 303 is communicatively coupled to the processor 305. The memory 303 stores processor-executable instructions which on execution cause the processor 305 to perform one or more steps. The processor 305 receives selection of a dashboard from one or more dashboards of a process. The dashboard display information of one or more key performance indicators of a process. The processor 305 generates at least one of a dynamic interactive packet and a static interactive packet for the selected dashboard for offline analysis using a dashboard data stored in the memory 303. The dashboard data comprises at least one of one or more metrics in the selected dashboard, query data associated with each of the one or more metrics, interactions between the one or more metrics and one or more formats for providing the interactive dashboard. The processor 305 provides the at least one of the dynamic interactive packet and the static interactive packet for the offline analysis. The dynamic interactive packet comprises information for rendering a dynamic interactive dashboard of the selected dashboard and the static interactive packet comprises one or more snapshots corresponding to each of one or more interactions on the selected dashboard.

Figure 3B:
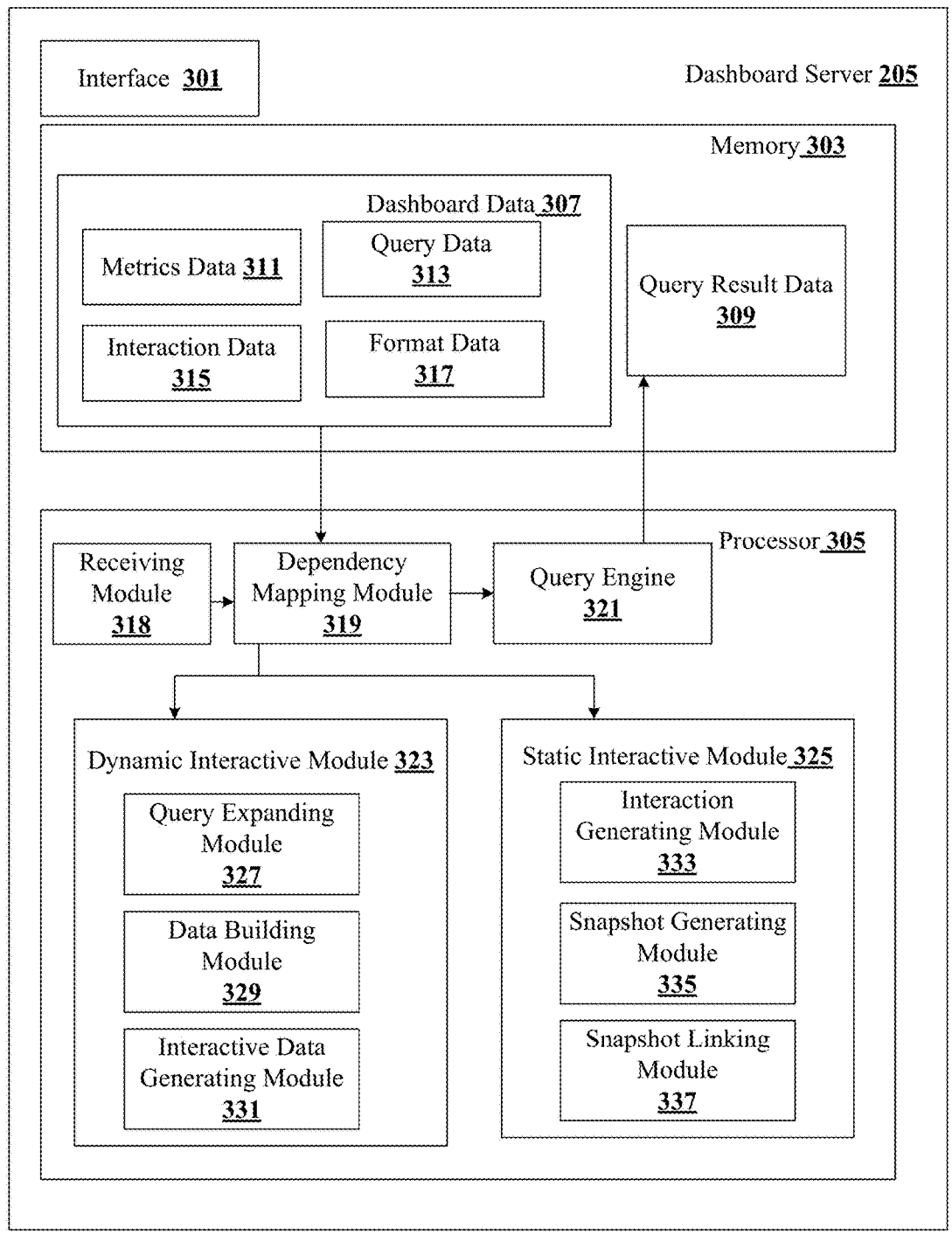
FIG. 3b shows a detailed block diagram illustrating a dashboard server for providing an interactive dashboard for offline analysis in accordance with some embodiments of the present disclosure.

FIG. 3b shows a detailed block diagram illustrating a dashboard server 205 for providing an interactive dashboard in accordance with some embodiments of the present disclosure.

In one implementation, the data may include a dashboard data 307 and a query result data 309. The dashboard data 307 comprises metrics data 311, query data 313, interaction data 315 and format data 317.

Figure 4:
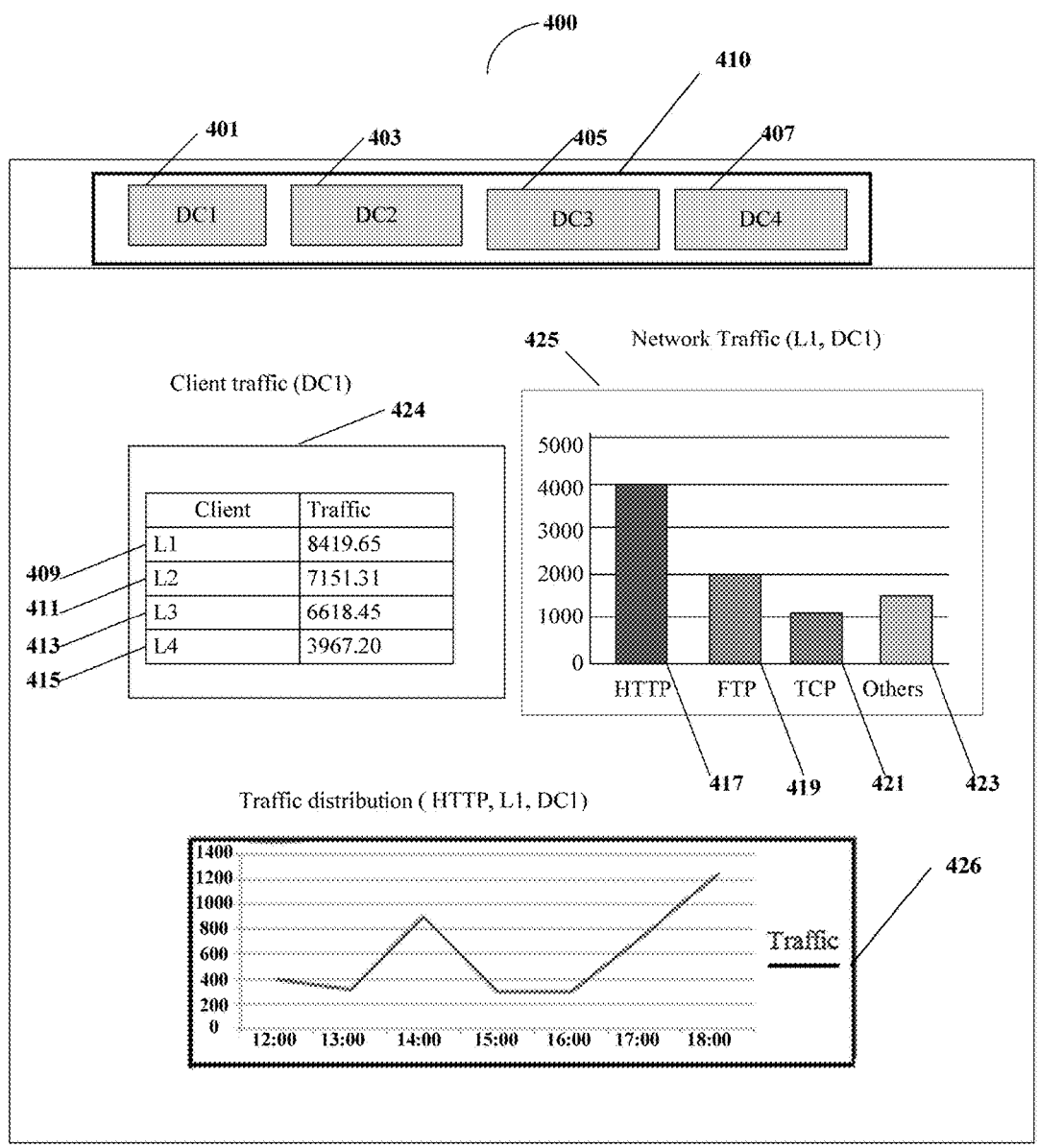
FIG. 4 shows an exemplary dashboard of the process in accordance with some embodiments of the present disclosure.

In an embodiment, the metrics data 311 may include information of one or more metrics in the selected dashboard. The metric is the visual representation of the data associated with a process. As an example, the process may be for identifying the network traffic distribution between one or more data centers of the organization. FIG. 4 shows the exemplary dashboard of the process. The one or more data centers are "DC1" 401, "DC2" 403, "DC3" 405 and "DC4" 407. The one or more data centers are represented in the metric 410. The one or more data centers are the values of the metric 410. There may be various clients connected to each of the data center. For example, the data center "DC1" 401 may have four clients namely "L1" 409, "L2" 411, "L3" 413 and "L4" 415. When the user selects a metric value, like data center "DC1" 401, the clients associated with the selected data center are represented in the metric 424. The network traffic associated with each client is also shown in the metric 424. If the user selects a metric value, like client "L1" 409, the detailed network traffic of the selected client is represented in the metric 425 in the form of a bar chart. FIG. 4 also shows the network traffic distribution of the selected client for specific time period in the metric 426.

In an embodiment, the query data 313 may include information of one or more queries associated with each metric in the dashboard. As an example, the query associated with the metric 424 is "Select client, sum (traffic) from traffic_table where dc='DC1' group by client"

The query associated with the metric 425 is

"Select network traffic, sum (traffic) from traffic table where dc='DC1' AND client='L1' group by network traffic"

The query associated with the metric 426 is

"Select hour, sum (traffic) from traffic_table where dc='DC1' AND client='L1' AND network traffic='HTTP' group by hour"

The query data 315 associated with each metric in the dashboard is stored in the memory 303.

In an embodiment, the interaction data 315 may include information of one or more interactions between the one or more metrics in the dashboard. As an example, the interaction data 315 for the metric 410 are the data associated with the clients of DC1, DC2, DC3 and DC4. Similarly, the interactive data for the metric 424 are the data associated with the network traffic in "L1", "L2", "L3" and "L4".

In an embodiment, the format data 317 may include information of one or more formats in which the metrics are displayed on the dashboard. The metrics may be displayed in the form of chart, table, text etc.

In an embodiment, the query result data 309 may include information of the result of each of the executed query by the dashboard server 205.

The memory 303 may also include other data which may comprise temporary data and temporary files, generated by the modules for performing the various functions of the knowledge dashboard server.

The dashboard data 307 and the query result data 309 may be stored in the memory 303 in the form of various data structures. Additionally, the aforementioned data may be organized using data models, such as relational or hierarchical data models.

In an embodiment, the dashboard data 307 received from the one or more user devices 201 are processed by modules of the dashboard server 205. The modules may be stored within the memory 303. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The modules may include, for example, a receiving module 318, a dependency mapping module 319, a query engine 321, a dynamic interactive module 323 and a static interactive module 325. In an embodiment, the modules may perform the described functions independently or as a part of the processor.

In an embodiment, the receiving module 318 receives selection of a dashboard from one or more dashboards of the process. The dashboard may be selected from a live dashboard or from the dashboards stored in the memory 303 of the dashboard server 205.

In an embodiment, the dependency mapping module 319 creates a dependency structure for the one or more metrics in the selected dashboard. The dependency mapping module 319 creates the dependency structure for the one or more metrics in the dashboard using the dashboard data 307.

Figure 5:
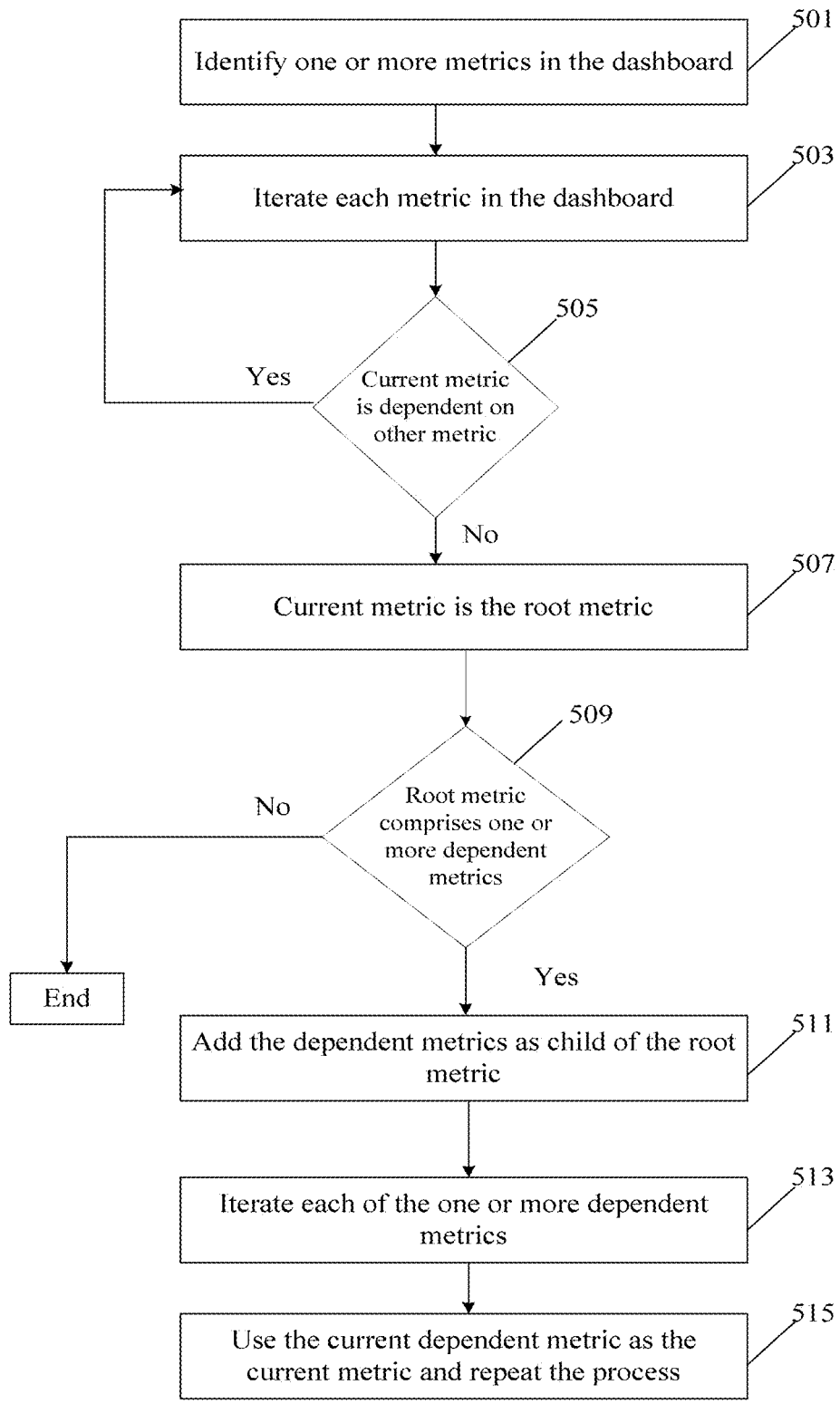
FIG. 5 illustrates a flowchart showing the process of creating a dependency structure for the one or more metrics in the dashboard in accordance with some embodiments of the present disclosure.

FIG. 5 illustrates the process for creating the dependency structure for the one or more metrics in accordance with some embodiments of the present disclosure.

As illustrated in FIG. 5, the method comprises one or more blocks for creating a dependency structure for the one or more metrics in the selected dashboard. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the method without departing from the spirit and scope of the subject matter described herein. Furthermore, the method can be implemented in any suitable hardware, software, firmware, or combination thereof.

At step 501, the dependency mapping module 319 identifies one or more metrics in the dashboard. Considering the example of the selected dashboard as shown in FIG. 4, the one or more metrics identified are 410, 424, 425 and 426.

At step 503, the dependency mapping module 319 processes each metric in the dashboard to identify one or more dependent metrics for each metric. As an example, the dependent metric for the metric 410 is 424. The dependent metric for the metric 424 is 425. The dependent metric for the metric 425 is 426.

At step 505, the dependency mapping module 319 determines whether each metric is dependent on other metrics. If the metric is independent, i.e it is not dependent on any other metric, then the method proceeds to block 507 via "No". If the metric is dependent on other metrics then the method proceeds to block 503 via "Yes" for processing each metric until the root metric is identified. As an example, the metric 410 is not dependent on any other metrics. But, the metric 424 is dependent on the metric 410.

At step 507, the dependency mapping module 319 configures the one or more metrics which are independent as the root metrics/parent metrics. As an example, the metric 410 is the root metric.

At step 509, the dependency mapping module 319 determines whether the root metrics include one or more dependent metrics. If the root metrics does not include one or more dependent metrics then the method stops. If the root metrics includes one or more dependent metrics, then the method proceeds to block 511 via "Yes". As an example, the one or more dependent metrics of the root metric 410 is 424.

At step 511, the dependency mapping module 319 configures the one or more dependent metrics as the child metrics of the root metric. As an example, the metric 424 is the child metric of the root metric 410.

At step 513, the dependency mapping module 315 processes each of the one or more dependent metrics.

At step 515, the dependency mapping module 315 configures each child metric as the current dependent metric and repeats the process of identifying the one or more dependent metrics for the current dependent metric. As an example, the metric 424 is set as the current dependent metric and the metric 425 is the dependent metric of 424.

The dependency mapping module creates the dependency structure for the one or more metrics in the selected dashboard using the method steps as described in FIG. 5. An exemplary dependency structure is as shown in FIG. 6b.

Referring back to FIG. 3, the query engine 321 performs querying the data for each metric in the dashboard.

In an embodiment, the dynamic interactive module 323 is configured to generate a dynamic interactive packet. The dynamic interactive module 323 includes a query expanding module, a 327, a data building module 329 and an interactive data generating module 331.

In an embodiment, the query expanding module 327 is configured to expand the queries of each metric in the selected dashboard so as to facilitate querying and exporting of all the data required by the dashboard to a data record. The query expanding module 327 executes the query of each of the root metrics. Then based on the query results of the root metric, the query expanding module 327 expands the queries of each of the dependent metrics. The process of expanding the query associated with each metric in the selected dashboard is carried out until all the metrics are executed.

As an example, the expanded query is Select data center, client, traffic_type, sum (traffic) from Traffic_Table_Day, group by data center, client, and traffic_type, where data center in ("DC1","DC2","DC3","DC4") and client in ("L1", "L2","L3","L4"). The expanded query is executed for providing all the interactions possible in the dashboard.

In an embodiment, the data building module 329 is configured to create a local data store for storing the data record of query results of each metric in the selected dashboard.

In an embodiment, the interactive data generating module 331 is configured to generate an interactive data. As an example, the interactive data may be a file in Hyper Text Mark-Up language (HTML) with JavaScript or Silverlight TM format. The interactive data includes information for rendering the dynamic interactive dashboard using the data record.

In an embodiment, the static interactive module 325 is configured to generate a static interactive packet. The static interactive module 325 includes an interaction generating module 333, a snapshot generating module 335 and a snapshot linking module 337.

The interaction generating module 333 is configured to identify one or more interactions between each of the one or more metrics. As an example, when the user selects the value "DC1" 401 in the metric 410, the metric 424 is displayed, wherein the metric 424 comprises the values "L1" 409, "L2" 411, "L3" 413, "L4" 415. Similarly, when the user selects the value "L1" 409 in the metric 424, the network traffic of "L1" 409 namely "HTTP" 417, "FTP" 419, "TCP" 421 and "Others" 423 are displayed in the metric 425. These interactions are identified by the interaction generating module 333.

The snapshot generating module 335 is configured to generate the snapshot for each of the one or more interactions. As an example, the snapshot may be an image or in text/Hyper Text Mark-Up language (HTML) format or Scalable Vector Graphics (SVG) format or portable document format (PDF) format. The snapshot is generated for each interaction in the dashboard. As an example, one snapshot may show the four different data centers. The other snapshot may show the various clients associated with the data center "DC1" 401.

The snapshot linking module 337 is configured to link the snapshots based on the one or more interactions between the one or more metrics. As an example, the snapshot showing four different data centers may have four links. Each link is provided for each of the data center. Therefore, when a user selects the link associated with the data center "DC1" 401, the snapshot associated with the data center "DC1" 401 i.e the snapshot showing the clients of "DC1" are displayed.

Figure 6A:
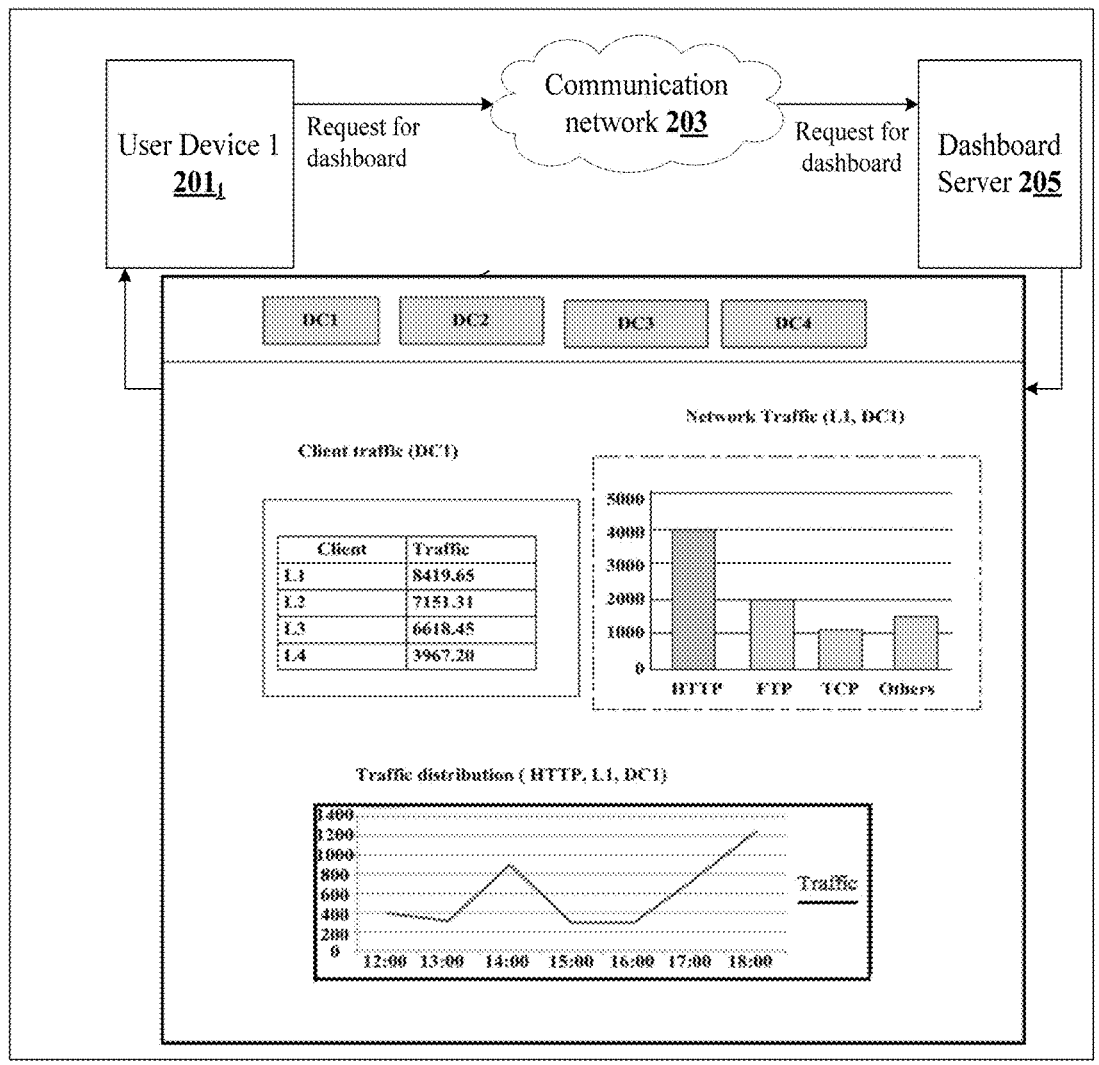
FIGS. 6a-6c illustrates an exemplary embodiment of providing a dynamic interactive format for exporting the selected dashboard in accordance with some embodiments of the present disclosure.
Figure 6B:
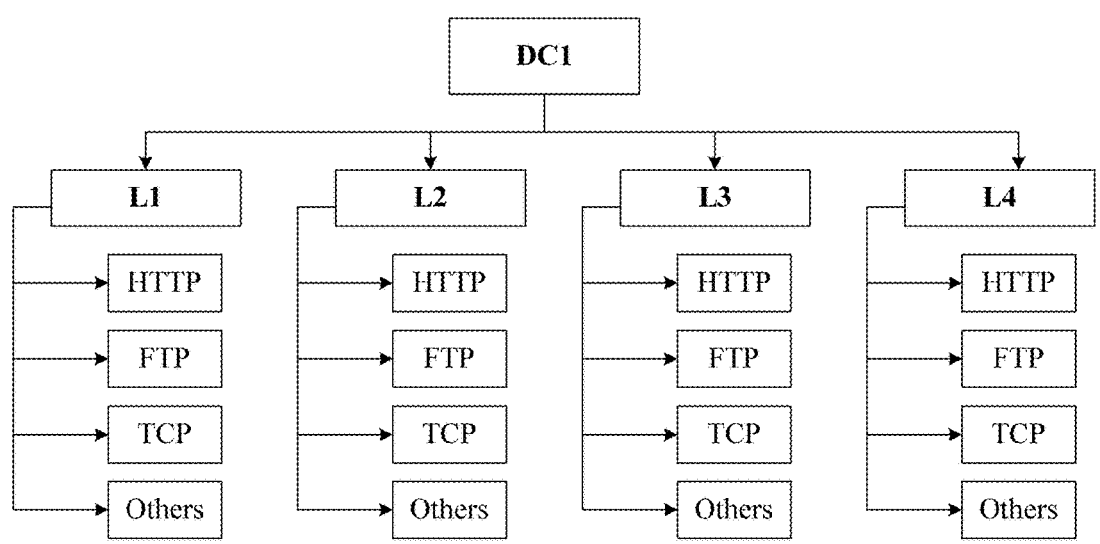
Figure 6C:
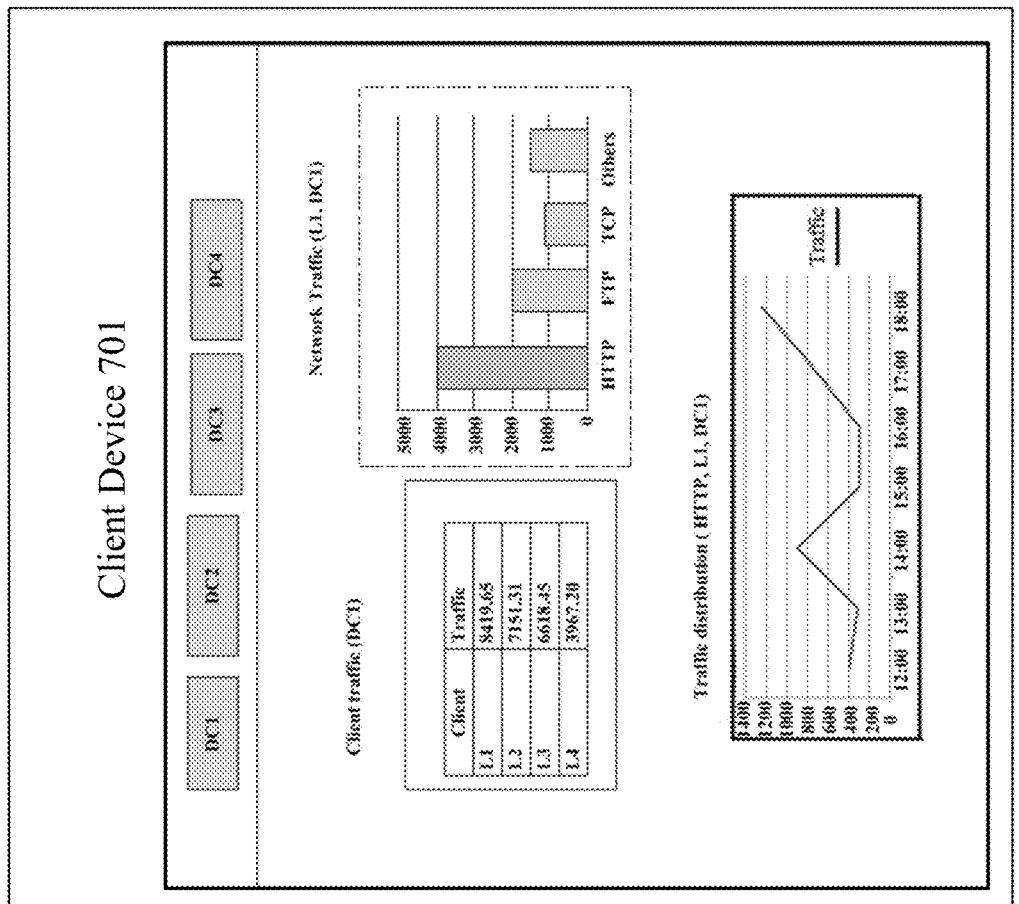
Figure 6C:
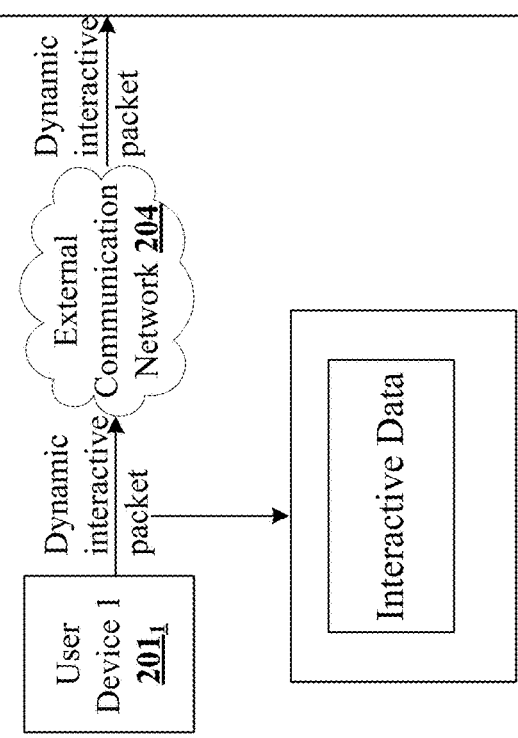

FIGS. 6a-6c illustrates an exemplary embodiment of providing a dynamic interactive format for exporting the selected dashboard in accordance with some embodiments of the present disclosure.

As an example, the process may be for the identifying network traffic distribution between one or more data centers of an organization. The organization may be associated with the dashboard server. The dashboard server 205 is configured to provide the one or more dashboards associated with the process. The end user/stakeholder of the organization may select one of the one or more dashboards through the communication network 203. The communication network 203 may be a Local Area Network (LAN) of the organization. The dashboard server 205 provides the selected dashboard to the user device 1 2011 associated with the end user/stakeholder as shown in FIG. 6a.

In an embodiment, the user device 1 2011 may export the selected dashboard to one or more other users external to the organization. The user device 1 2011 may export the selected dashboard in a dynamic interactive format. The dashboard server 205 generates the dynamic interactive packet for the dynamic interactive format. The dynamic interactive module 323 of the dashboard server 205 is configured to generate the dynamic interactive packet. The dynamic interactive module 323 includes the query expanding module 327, the data building module 329 and the interactive data generating module 331. The dependency mapping module 319 of the dashboard server 205 creates the dependency structure for the metrics in the selected dashboard.

As an example, the dependency structure for the value "DC1" 401 in the metric 410 is as shown in the FIG. 6b. Upon creating the dependency structure, the query expanding module 327 executes the query associated with each metric in the dashboard. Based on the query result of each metric, the query expanding module 327 expands and executes the query associated with one or more dependent metrics of each metric.

The data building module 329 creates a local data store and stores the data record of the query result of each metric in the selected dashboard in the local data store. The interactive data generating module 331 generates the interactive data based on the data record and the dashboard data 307. The interactive data includes information for rendering the dynamic interactive dashboard.

As shown in FIG. 6c, the dynamic interactive packet includes the interactive data. The user device 1 2011 exports the dynamic interactive packet to a client device 701 over an external communication network 204. The interactive data includes information for rendering the dynamic dashboard in the format defined in the dashboard data 307.

FIGS. 7a-7d illustrates an exemplary embodiment of providing a static interactive format for exporting the dashboard in accordance with some embodiments of the present disclosure.

Figure 7A:
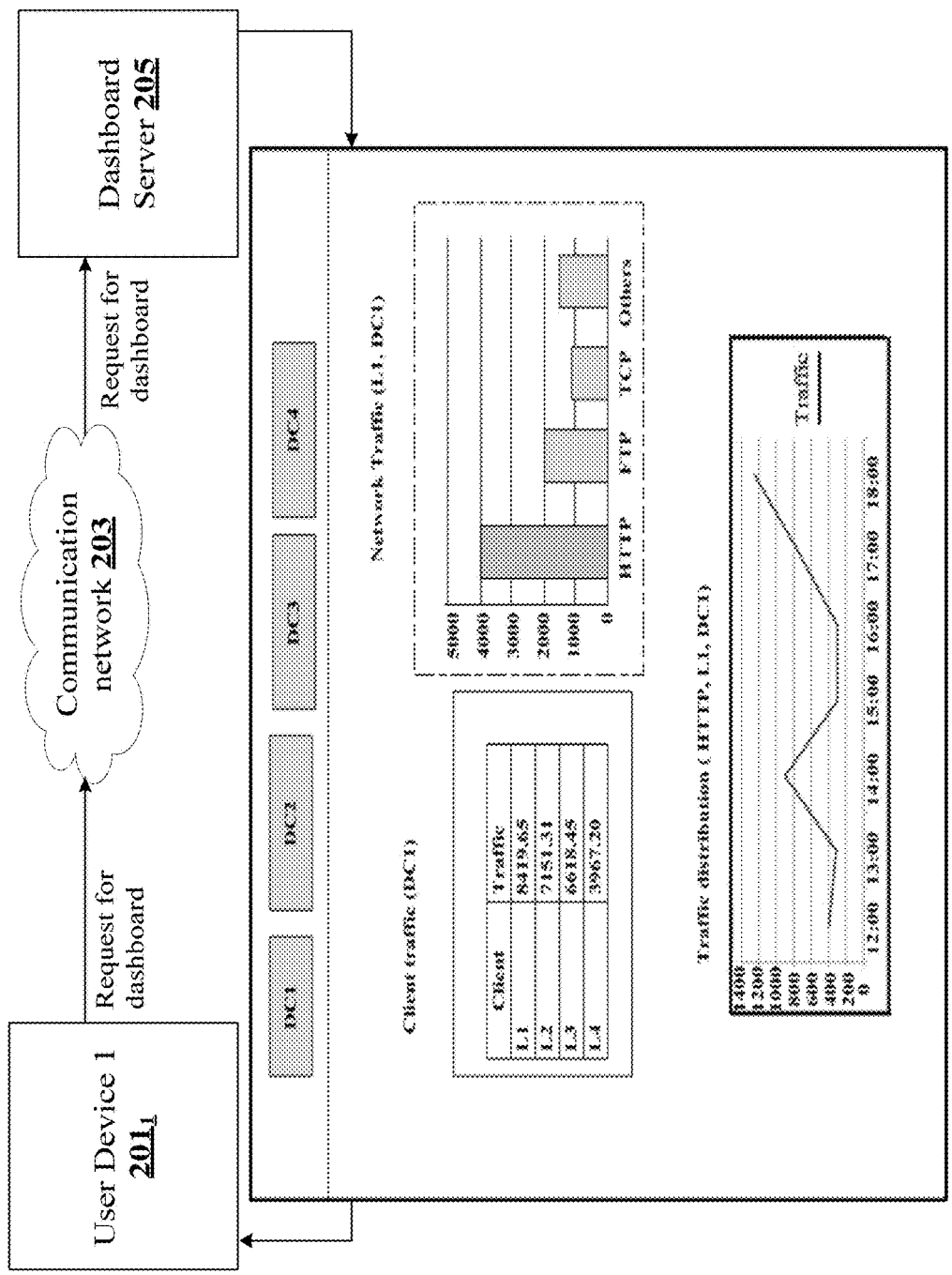

As an example, the process may be for the identifying the network traffic distribution between one or more data centers of the organization. The organization may be associated with the dashboard server 205. The dashboard server 205 is configured to provide the one or more dashboards associated with the process. The end user/stakeholder of the organization may select one of the one or more dashboards through the communication network 203. The communication network 203 may be a LAN for the organization. The dashboard server 205 provides the selected dashboard to the user device 1 2011 associated with the end user/stakeholder as shown in FIG. 7a.

In an embodiment, the end user/stakeholder may export the selected dashboard to one or more other users within the organization. The dashboard server may generate one or more dashboard for the process and store the dashboards in the memory 303. The end user may select one of the one or more generated dashboards from the memory 303 for the offline analysis. The end user may export the selected dashboard in a static interactive format. The dashboard server 205 generates the static interactive packet for the static interactive format. The static interactive module 325 of the dashboard server 205 is configured to generate the static interactive packet.

The static interactive module 325 includes the interaction generating module 333, the snapshot generating module 335 and the snapshot linking module 337. The interaction generating module 333 identifies one or more interactions possible between the metrics. As an example, the one or more interactions possible between the metrics in the selected dashboard are the interaction between the data center and the multiple clients, interaction between each client and its corresponding network traffic and so on.

Figure 7B:
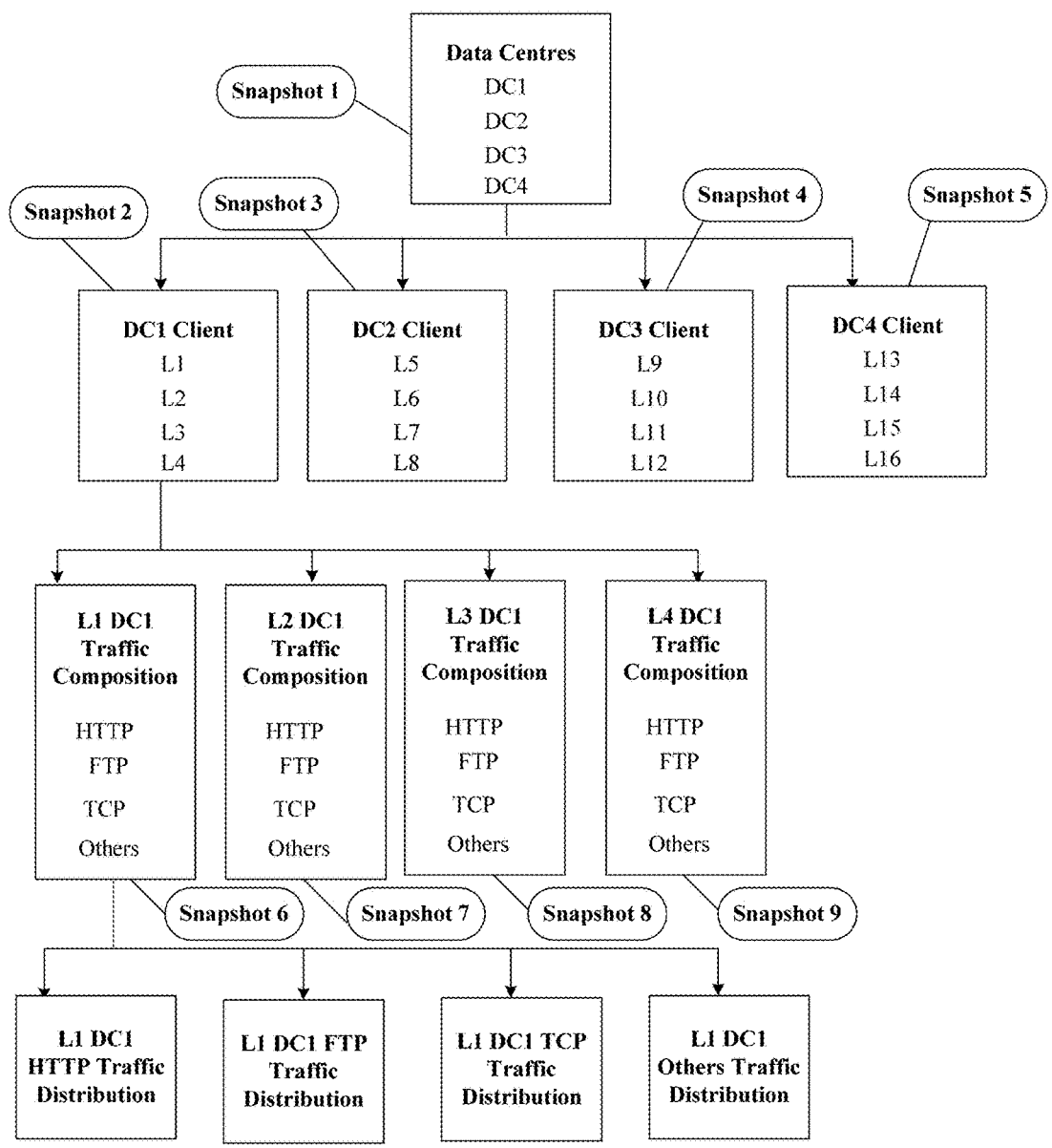

The snapshot generating module 335 generates a snapshot for each of the interaction between the one or more metrics in the selected dashboard. The snapshots generated for the interaction for the data center "DC1" 401, one of its clients "L1" 409 and one or more type of network traffic associated with "L1"are as shown in FIG. 7b. The snapshot 1 shows four different data centers of the process. The snapshot 2 shows clients of the datacenter "DC1" 401. The snapshot 3 shows the clients of the data center "DC2" 403. The snapshot 4 shows the clients of the data center "DC3" 405. The snapshot 5 shows the clients of the datacenter "DC4" 407. Similarly, the snapshot 6 shows the network traffic of the client "L1" 409, snapshot 7 shows the network traffic of the client "L2" 411, the snapshot 8 shows the network traffic of the client"L3" 413 and snapshot 9 shows the network traffic of the client "L4" 415. The snapshot linking module is configured to link the snapshots based on one or more interactions between the metrics.

Figure 7D:
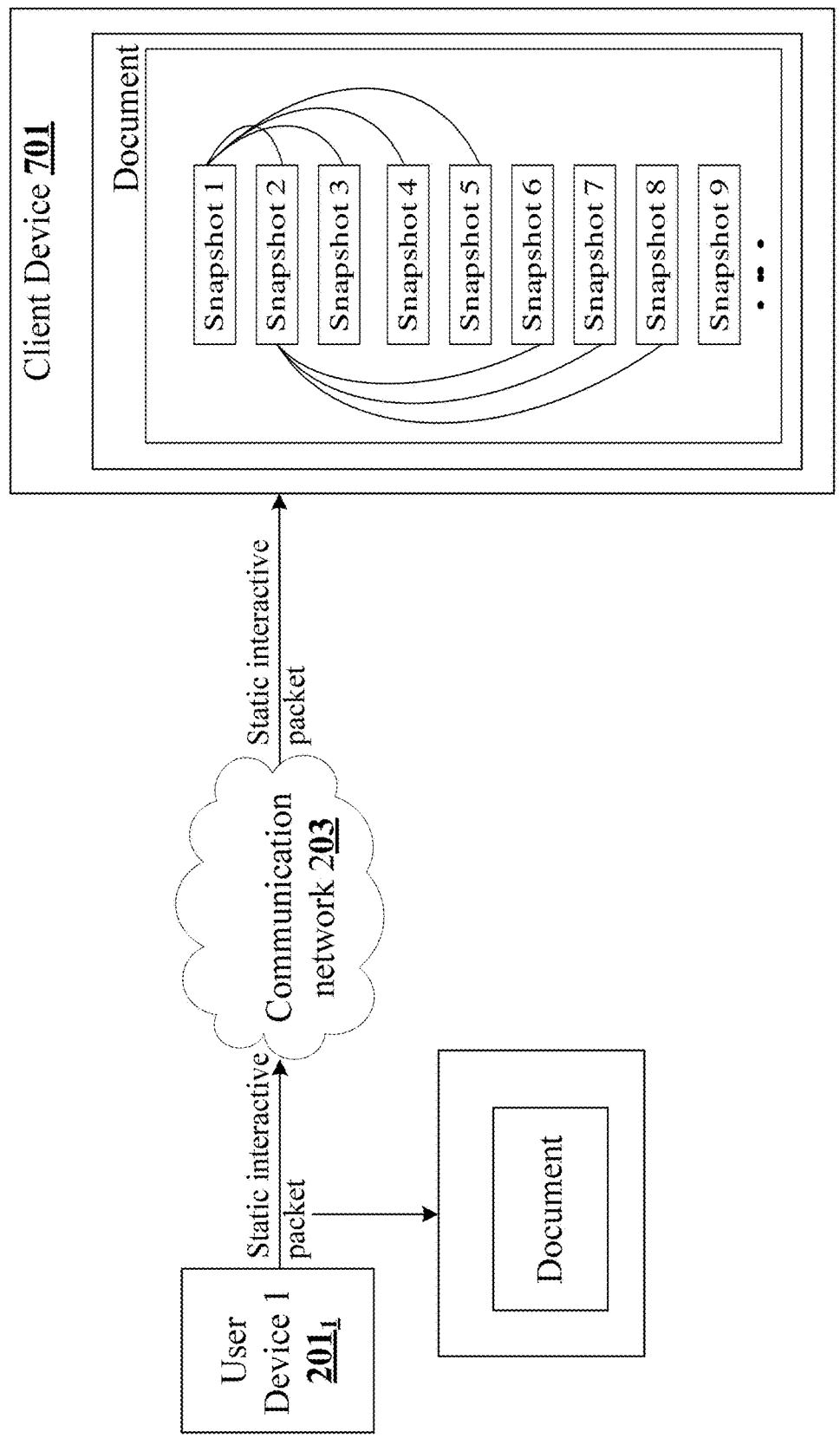

As an example, the snapshot 1 may be linked to snapshot 2, snapshot 3, snapshot 4 and snapshot 5 as shown in FIG. 7c. The snapshot 1 may be provided with four hyperlinks, each link for each of the data center. So when user selects any one of the data center, the snapshot associated with the selected data center will be provided. The static interactive packet includes a static document. The static document may be a word document or a pdf document. The user device 2011 exports the static interactive packet to the client device 701 through the communication network 203 as shown in FIG. 7d.

Figure 8:
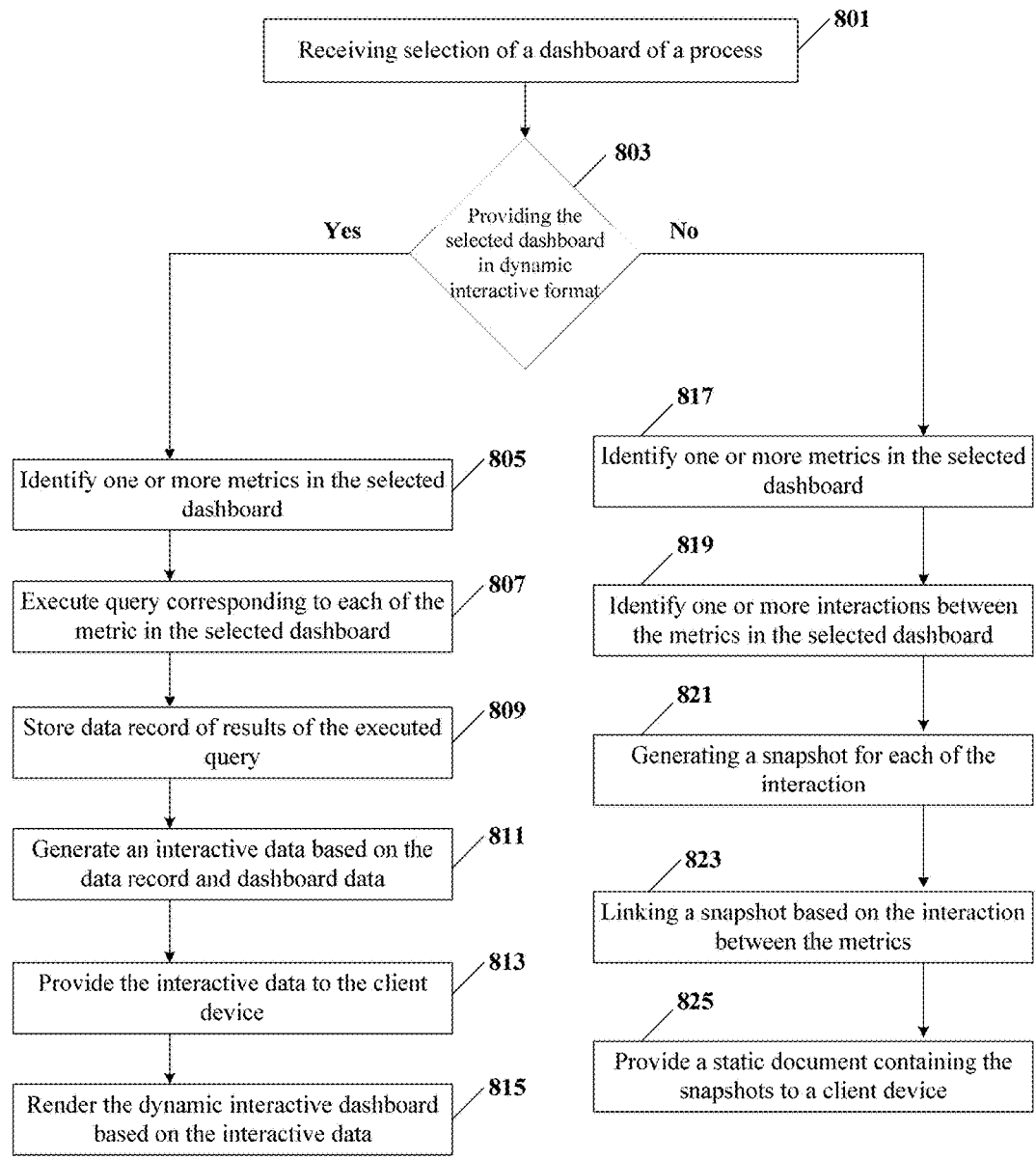
FIG. 8 shows a flowchart illustrating method of providing a dynamic interactive dashboard of a process for the offline analysis in accordance with some embodiments of the present disclosure.

FIG. 8 shows a flowchart illustrating method of providing an interactive dashboard of a process for the offline analysis in accordance with some embodiments of the present disclosure.

As illustrated in FIG. 8, the method comprises one or more steps for providing an interactive dashboard of a process for the offline analysis. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the method without departing from the spirit and scope of the subject matter described herein. Furthermore, the method can be implemented in any suitable hardware, software, firmware, or combination thereof.

At step 801, the dashboard server 205 receives selection of a dashboard from one or more dashboards associated with a process. The process may be for identifying network traffic in one or more data centers of an organization. The end user/stakeholder of the organization may view the dashboard of the process. The end user/stakeholder provides a request to the dashboard server 205. The dashboard server 205 provides the dashboard of the process.

In an embodiment, the end user/stakeholder may provide the selected dashboard for one or more users for the offline analysis. The user may provide the selected dashboard in at least one of the dynamic interactive format and the static interactive format.

At step 803, the dashboard sever 205 determines if the selected dashboard has to be provided in either static interactive format or dynamic interactive format. If the end user selects the dynamic interactive format, then the method proceeds to step 805 via "Yes". Otherwise, the method proceeds to step 817 via "No".

At step 805, the dynamic interactive module 323 of the dashboard server 205 identifies on or more metrics in the selected dashboard.

At step 807, the query corresponding to each of the metric in the selected dashboard is executed. The query expanding module 327 of the dynamic interactive module 323 expands the query of each of the independent metric. Based on the results of the independent metrics, the query expanding module 327 expands the queries of each of the one or more dependent metrics of each of the independent metrics. Thereafter, the query expanding module 327 executes the query of each of the dependent metrics. The query is expanded until each of the metric in the selected dashboard is executed.

At step 809, the data record of the results of the executed query is stored. The data building module 329 of the dynamic interactive module 323 stores the data record of the query results of each metric in the selected dashboard.

At step 811, the interactive data is generated. The interactive data generating module 331 of the dynamic interactive module 323 generates the interactive data. The interactive data includes information for rendering the selected dashboard using the data record and the dashboard data.

At step 813, the interactive data is provided to the client device. The end user/stakeholder provides the dynamic interactive packet to the client device 701. The dynamic interactive packet includes the interactive data.

At step 815, the interactive data in the dynamic interactive packet renders the selected dashboard in the dynamic interactive format.

At step 817, the static interactive module 325 of the dashboard server 205 identifies on or more metrics in the selected dashboard.

At step 819, the one or more interactions between the metrics in the selected dashboard are identified. The interaction generating module 323 of the static interactive module 325 identifies one or more interactions between each of the one or more metrics in the selected dashboard.

At step 821, a snapshot is generated for each of the one or more interactions. The snapshot generating module 335 of the static interactive module 325 generates a snapshot for each of the one or more interactions and the multiple snapshots are stored in a static document.

At step 823, a link is created for each snapshot based on the one or more interactions. The snapshot linking module 337 provides a link for each snapshot. When a user selects the link in a particular snapshot, the link would open/scroll-to another snapshot of the dashboard that would otherwise result if the user has done the same interaction on a live dashboard.

At step 825, the end user/stakeholder provides a static document to the client device. The static document includes the multiples snapshots.

Figure 9:
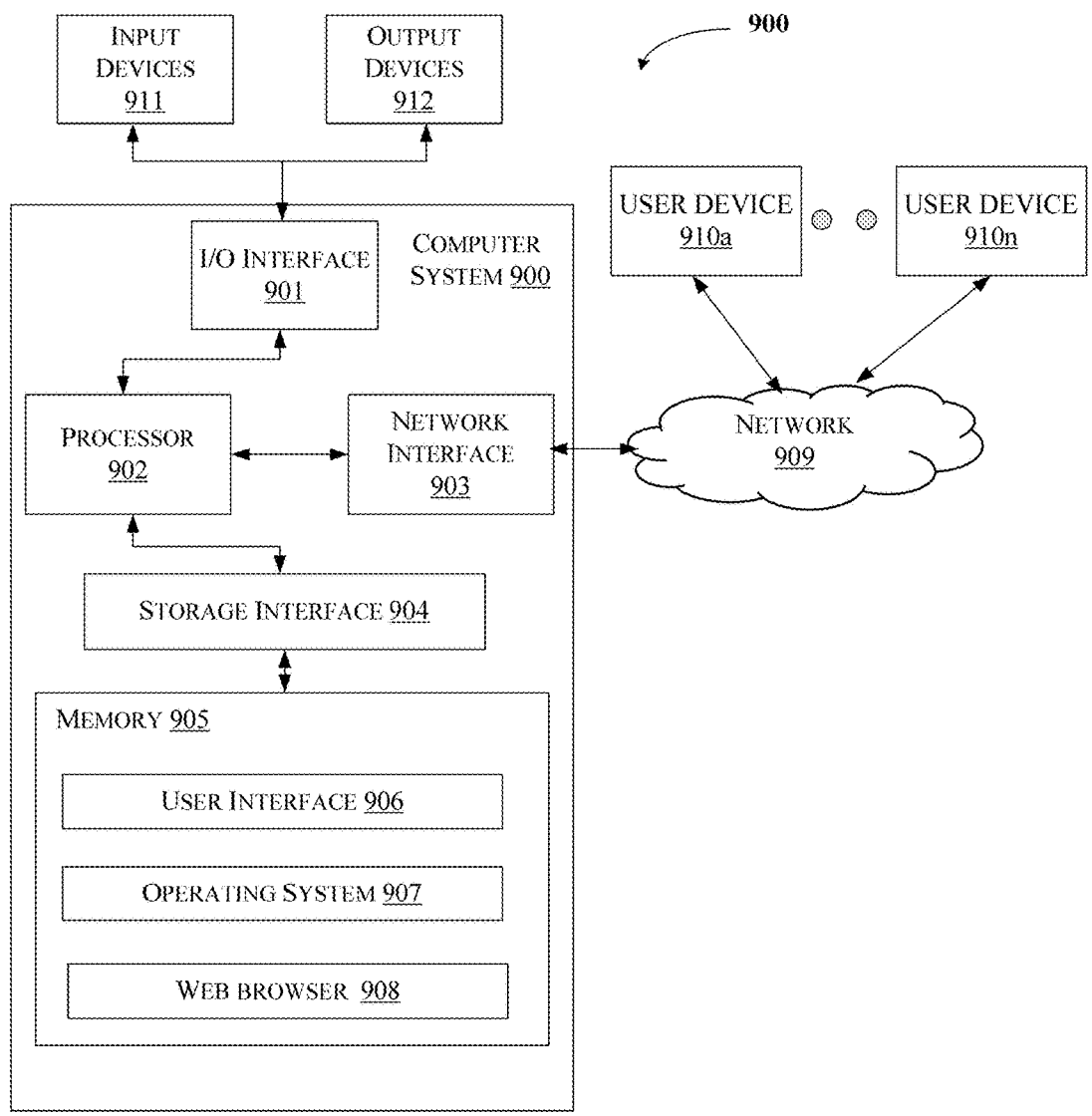
FIG. 9 illustrates a block diagram of an exemplary computer system for implementing embodiments consistent with the present disclosure.

FIG. 9 illustrates a block diagram of an exemplary computer system 900 for implementing embodiments consistent with the present disclosure. In an embodiment, the computer system 900 is used to implement the process of providing an interactive dashboard for the offline analysis. The computer system 900 may comprise a central processing unit ("CPU" or "processor") 902. The processor 902 may comprise at least one data processor for executing program components for executing user- or system-generated business processes. A user may include a person, a person using a device such as such as those included in this invention, or such a device itself. The processor 902 may include specialized processing units such as integrated system (bus) controllers, memory management control units, floating point units, graphics processing units, digital signal processing units, etc.

The processor 902 may be disposed in communication with one or more input/output (I/O) devices (911 and 912) via I/O interface 901. The I/O interface 901 may employ communication protocols/methods such as, without limitation, audio, analog, digital, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, Video Graphics Array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 901, the computer system 900 may communicate with one or more I/O devices (911 and 912).

In some embodiments, the processor 902 may be disposed in communication with a communication network 909 via a network interface 903. The network interface 903 may communicate with the communication network 909. The network interface 903 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 903 and the communication network 909, the computer system 900 may communicate with one or more user devices 910 (a, . . . ,n). The communication network 909 can be implemented as one of the different types of networks, such as intranet or Local Area Network (LAN) and such within the organization. The communication network 909 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 909 may include a variety of network devices, including routers, bridges, servers, computing devices, storage devices, etc. The one or more user devices 910 (a, . . . ,n) may include, without limitation, personal computer(s), mobile devices such as cellular telephones, smartphones, tablet computers, eBook readers, laptop computers, notebooks, gaming consoles, or the like.

In some embodiments, the processor 902 may be disposed in communication with a memory 905 (e.g., RAM, ROM, etc. not shown in FIG. 9) via a storage interface 904. The storage interface 904 may connect to memory 905 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 905 may store a collection of program or database components, including, without limitation, user interface application 906, an operating system 907, web server 908 etc. In some embodiments, computer system 900 may store user/application data 906, such as the data, variables, records, etc. as described in this invention. Such databases may be implemented as fault-tolerant, relational, scalable, secure databases such as Oracle or Sybase.

The operating system 907 may facilitate resource management and operation of the computer system 900. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/ 7/8, etc.), Apple iOS, Google Android, Blackberry Operating System (OS), or the like. User interface 906 may facilitate display, execution, interaction, manipulation, or operation of program components through textual or graphical facilities. For example, user interfaces may provide computer interaction interface elements on a display system operatively connected to the computer system 900, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 900 may implement a web browser 908 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 900 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 900 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Additionally, advantages of present disclosure are illustrated herein.

Embodiments of the present disclosure provide an interactive dashboard for offline analysis.

Embodiments of the present disclosure provide a method for exporting the dashboard without the server and still provide an interactive dashboard. The interactive dashboard may be exported and shared with one or more users in same/different network.

Embodiments of the present disclosure reduces load on the server as the interactive dashboard can be used without accessing the server.

Embodiments of the present disclosure provide a method for exporting the dashboard in at least one of a static interactive format and a dynamic interactive format. In the static interactive format the one or more snapshots with links are provided. So, when the user selects a data item in the snapshot, the link would open/scroll the other snapshot.

In an embodiment, the dynamic interactive format contains information for rendering the dashboard that looks and works exactly like the original dashboard but without the use of the server.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present disclosure are intended to be illustrative, but not limiting, of the scope of the invention, which is set forth in the following claims.

What is claimed is:

1. A method, comprising:
receiving, by a dashboard server, selection of a dashboard by a user, wherein the dashboard displays information of one or more key performance indicators of a process for offline, analysis;
generating, by the dashboard server, one or more of a dynamic interactive packet and a static interactive packet for the selected dashboard using dashboard data stored in a memory of the dashboard server, wherein the dynamic interactive packet comprises information for rendering a dynamic interactive dashboard of the selected dashboard, and the static interactive packet comprises one or more snapshots corresponding to each of one or more interactions on the selected dashboard, and wherein generating the dynamic interactive packet comprises:
identifying one or more metrics in the selected dashboard;
identifying one or more dependencies between the one or more metrics;
expanding a query for each of the one or more metrics based on the one or more dependencies between the one or more metrics, to form an expanded query for each of the one or more metrics;
executing the expanded query for each of the one or more metrics;
storing a data record of results of each executed query; and
generating the dynamic interactive packet, wherein the dynamic interactive packet includes information for rendering the dynamic interactive dashboard using the data record and the dashboard data;
providing, by the dashboard server, an interactive dashboard to the user for the offline analysis using the dynamic interactive packet, the static interactive packet, or both; and
wherein expanding the query for each of the one or more metrics based on the one or more dependencies between the one or more metrics, to form an expanded query for each of the one or more metrics, and executing the expanded query for each of the one or more metrics is repeated until each of the one or more metrics in the selected dashboard is executed.

2. The method as claimed in claim 1, wherein the dashboard data comprises a metric of the one or more metrics in the selected dashboard, query data associated with each metric in the dashboard data, interactions between metrics in the dashboard data, or a format for providing the interactive dashboard.

3. The method as claimed in claim 1, wherein the data record of the results of each executed query is stored in a local data store.

4. The method as claimed in claim 1, wherein generating the static interactive packet comprises:
identifying the one or more metrics in the selected dashboard;

determining one or more interactions between each of the one or more metrics;
generating a snapshot of the one or more snapshots for each of the one or more interactions;
linking the one or more snapshots based on the one or more interactions between each of the one or more metrics; and
generating the static interactive packet, wherein the static interactive packet comprises the one or more snapshots corresponding to each of the one or more interactions on the selected dashboard.

5. A dashboard server, comprising:
a receiver, configured to receive a selection of a dashboard from one or more dashboards of a process for offline analysis; and
a processor, configured to generate one or more of a dynamic interactive packet and a static interactive packet for the selected dashboard using dashboard data stored in a memory of the dashboard server, wherein the dynamic interactive packet comprises information for rendering a dynamic interactive dashboard for the selected dashboard, and wherein the static interactive packet comprises one or more snapshots corresponding to one or more interactions on the selected dashboard, and wherein generating the dynamic interactive packet comprises:
identifying one or more metrics in the selected dashboard;
identifying one or more dependencies between the one or more metrics in the selected dashboard;
expanding a query for each of the one or more metrics in the selected dashboard based on the one or more dependencies between the one or more metrics, to form an expanded query for each of the one or more metrics;
executing the expanded query for each of the one or more metrics in the selected dashboard;
storing a data record of results of each executed query;
generating a dynamic interactive packet, wherein the dynamic interactive packet includes information for rendering the dynamic interactive dashboard using the data record and the dashboard data; and
wherein the processor is configured to expand the query for each of the one or more metrics, to form an expanded query for each of the one or more metrics, and to execute the expanded query for each of the one or more metrics in the selected dashboard, until each of the one or more metrics in the selected dashboard is executed.

6. The dashboard server as claimed in claim 5, wherein the dashboard server comprises a local data store for storing the data record of the results of each executed query.

7. The dashboard server as claimed in claim 5, wherein generating the static interactive packet comprises:
identifying the one or more metrics in the selected dashboard;
determining one or more interactions between each of the one or more metrics using the dashboard data;
generating a snapshot of the one or more snapshots for each of the one or more interactions;
linking the one or more snapshots based on the one or more interactions between each of the one or more metrics; and
generating the static interactive packet, wherein the static interactive packet comprises the one or more snapshots corresponding to each of the one or more interactions on the selected dashboard.

8. A non-transitory computer readable medium including instructions stored thereon that, when processed by at least one processor, cause a dashboard server to perform:
receiving a selection of a dashboard by a user, wherein the dashboard displays information of one or more key performance indicators of a process for offline analysis;
generating one or more of a dynamic interactive packet and a static interactive packet for the selected dashboard using dashboard data stored in a memory of the dashboard server, wherein the dynamic interactive packet comprises information for rendering a dynamic interactive dashboard of the selected dashboard and the static interactive packet comprises one or more snapshots corresponding to each of one or more interactions on the selected dashboard; and wherein generating the dynamic interactive packet comprises:
identifying one or more metrics in the selected dashboard;
identifying one or more dependencies between the one or more metrics;
expanding a query for each of the one or more metrics based on the one or more dependencies between the one or more metrics, to form an expanded query for each of the one or more metrics;
executing the expanded query for each of the one or more metrics;
storing a data record of results of each executed query; and
generating the dynamic interactive packet, wherein the dynamic interactive packet includes information for rendering the dynamic interactive dashboard using the data record and the dashboard data;
providing an interactive dashboard to the user for the offline analysis using the dynamic interactive packet, the static interactive packet, or both; and
wherein expanding the query for each of the one or more metrics based on the one or more dependencies between the one or more metrics to form an expanded query for each of the one or more metrics, and executing the expanded query for each of the one or more metrics is repeated until each of the one or more metrics in the selected dashboard is executed.

9. The non-transitory computer readable medium as claimed in claim 8, wherein generating the static interactive packet comprises:
identifying the one or more metrics in the selected dashboard;
determining one or more interactions between each of the one or more metrics using the dashboard data;
generating a snapshot of the one or more snapshots for each of the one or more interactions;
linking the one or more snapshots based on the one or more interactions between each of the one or more metrics; and
generating the static interactive packet, wherein the static interactive packet comprises the one or more snapshots corresponding to each of the one or more interactions on the selected dashboard.

10. A dashboard server, comprising:
a processor;
an input/output interface; and
a non-transitory memory storing dashboard data and instructions;
wherein the dashboard server is configured to receive a selection of a dashboard by a user; and
wherein the processor is configured to execute the instructions to:

generate one or more of a dynamic interactive packet and a static interactive packet for the selected dashboard using the dashboard data stored in the memory, wherein the dynamic interactive packet comprises information for rendering a dynamic interactive dashboard of the selected dashboard and the static interactive packet comprises one or more snapshots corresponding to each of one or more interactions on the selected dashboard, and wherein generating the dynamic interactive packet comprises:

identifying one or more metrics in the selected dashboard;

identifying one or more dependencies between the one or more metrics;

expanding a query for each of the one or more metrics based on the one or more dependencies between the one or more metrics, to form an expanded query for each of the one or more metrics;

executing the expanded query for each of the one or more metrics;

storing a data record of results of each executed query; and generating the dynamic interactive packet, wherein the dynamic interactive packet includes information for rendering the dynamic interactive dashboard using the data record and the dashboard data;

provide an interactive dashboard to the user for offline analysis using the dynamic interactive packet, the static interactive packet, or both; and wherein expanding the query for each of the one or more metrics based on the one or more dependencies between the one or more metrics, to form an expanded query for each of the one or more metrics, and executing the expanded query for each of the one or more metrics is repeated until each of the one or more metrics In the selected dashboard is executed.

11. The dashboard server as claimed in claim 10, wherein the dashboard data comprises at least one of: a metric of the one or more metrics in the selected dashboard, query data associated with each metric of the one or more metrics in the dashboard, interactions between the one or more metrics, or one or more formats for providing the interactive dashboard.

12. The dashboard server as claimed in claim 10, wherein generating the static interactive packet comprises:

identifying the one or more metrics in the selected dashboard;

determining one or more interactions between each of the one or more metrics;

generating a snapshot of the one or more snapshots for each of the one or more interactions;

linking the one or more snapshots based on the one or more interactions between each of the one or more metrics; and generating the static interactive packet, wherein the static interactive packet comprises the snapshots corresponding to each of the one or more interactions on the selected dashboard.

* * * * *